US009232066B2

(12) United States Patent
Kuang

(10) Patent No.: US 9,232,066 B2
(45) Date of Patent: Jan. 5, 2016

(54) METHOD AND APPARATUS FOR QUEUE ROUTING

(75) Inventor: Yan Kuang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 108 days.

(21) Appl. No.: 13/371,613

(22) Filed: Feb. 13, 2012

(65) Prior Publication Data

US 2012/0140916 A1 Jun. 7, 2012

Related U.S. Application Data

(63) Continuation of application No. PCT/CN2010/073097, filed on May 24, 2010.

(30) Foreign Application Priority Data

Aug. 13, 2009 (CN) .......................... 2009 1 0090501

(51) Int. Cl.
*H04M 3/523* (2006.01)

(52) U.S. Cl.
CPC ...... *H04M 3/5232* (2013.01); *H04M 2203/551* (2013.01)

(58) Field of Classification Search
USPC .................................................... 379/266.01
See application file for complete search history.

(56) References Cited

U.S. PATENT DOCUMENTS 5,822,400 A 10/1998 Smith
6,798,876 B1 * 9/2004 Bala .................... H04M 3/5233 379/265.02
6,826,194 B1 11/2004 Vered et al.
7,519,173 B2 * 4/2009 Flores ............ G06Q 10/063112 379/265.01
8,756,326 B1 * 6/2014 Elberse ................... H04L 67/02 709/219
2001/0011228 A1 * 8/2001 Shenkman ...................... 705/14
2005/0136319 A1 6/2005 Tsunoda et al.
2007/0291926 A1 12/2007 Anderson (Continued)

FOREIGN PATENT DOCUMENTS

CN 1293859 A 5/2001
CN 1317120 A 10/2001

(Continued)

OTHER PUBLICATIONS

International Search Report issued in corresponding PCT Patent Application No. PCT/CN2010/073097, mailed Sep. 2, 2010.

(Continued)

*Primary Examiner* — Amal Zenati
(74) *Attorney, Agent, or Firm* — Brinks Gilson & Lione

(57) ABSTRACT

Embodiments of the present invention disclose a method and an apparatus for queue routing. The method includes: obtaining history behavior information of a user accessing a call center system; analyzing the history behavior information, and performing queue routing on a call of the user based on an analysis result of the history behavior information. The embodiments of the present invention further disclose an apparatus for queue routing, including: an information obtaining module and a call processing module. By using the technical solutions according to the embodiments of the present invention, a dynamic queue routing mechanism is provided according to the history behavior information of the user, and thus, a more refined service manner is provided for the user and user experience is improved.

6 Claims, 4 Drawing Sheets

(56) References Cited

U.S. PATENT DOCUMENTS

| | | | |
|---|---|---|---|
| 2009/0110157 | A1 | 4/2009 | Erb |
| 2012/0128145 | A1 | 5/2012 | Shi |

FOREIGN PATENT DOCUMENTS

| | | | |
|---|---|---|---|
| CN | 1499847 | A | 5/2004 |
| CN | 101426057 | A | 5/2009 |
| RU | 2357380 | C1 | 5/2009 |
| WO | WO 2011/017961 | A1 | 2/2011 |

OTHER PUBLICATIONS

Office Action issued in corresponding Chinese Patent Application No. 200910090501.2, mailed Nov. 5, 2012.

Written Opinion of the International Searching Authority issued in corresponding PCT Patent Application No. PCT/CN2010/073097, mailed Sep. 2, 2010.

Office Action issued in corresponding Russian Patent Application No. 2012109387/07, mailed May 27, 2013, 7 pages.

* cited by examiner

METHOD AND APPARATUS FOR QUEUE ROUTING

CROSS-REFERENCE TO RELATED APPLICATIONS

This application is a continuation of International Application No. PCT/CN2010/073097, filed on May 24, 2010, which claims priority to Chinese Patent Application No. 200910090501.2, filed on Aug. 13, 2009, both of which are incorporated herein by reference in their entireties.

FIELD OF THE INVENTION

The present invention relates to the field of a call center technology in communication technologies, and in particular, to a method and an apparatus for queue routing.

BACKGROUND OF THE INVENTION

Currently, a maturely-developed call center technology has been widely applied in various industries. Particularly, with the popularization of a telephone service mode based on the call center technology, not only service level and operation efficiency are greatly improved, but also demands of users for more convenient services are satisfied.

The telephone service mode usually includes a manual service and an automatic service. Architecture of a call center system and a basic process of the manual service may be generally described as follows. After a user dials a call center number (for example, China Mobile 10086 or China Post 11185), the call enters the call center system through routing of a communication network; generally, an Automatic Call Distribution (ACD) of the call center is responsible for call access and distribution, and notifies Computer Telephony Integration (CTI) of managing a call access procedure (for example, controlling the call to be accessed by performing functions such as queuing, routing, or connection); the CTI connects, according to a service requested by the call and a current condition of operators, the service with a corresponding operator, and provides the service for the user corresponding to the call through customer service application software.

In a basic process of the automatic service, after a call enters the call center system, the CTI and an Interactive Voice Response (IVR) control a service access procedure. The CTI divides different service contents or levels into different queues according to service capabilities and service scopes of agents and operators. The IVR is an important device for processing automatic calls in the call center system, and is capable of providing a voice play for the user, receiving key input selected by the user, and providing different services according to the key information.

The service of accessing the call center system may be processed according to many manners, for example, an intelligent service manner, where after the call of the user accesses the call center system, basic information of the user (for example, the level of the user or the account type of the user) is identified according to the number, and the relatively differentiated service is provided for the user according to the basic information. However, in the existing processing manner, the differentiated service is provided merely according to the static information of the user, which has certain limitations, and more refined services cannot be provided for the user.

SUMMARY OF THE INVENTION

Embodiments of the present invention provide a method and an apparatus for queue routing, so as to provide a more refined service for a user.

The technical solutions of the embodiments of the present invention are described as follows.

An embodiment of the present invention provides a method for queue routing, where the method includes:

obtaining history behavior information of a user accessing a call center system; and analyzing the history behavior information, and performing queue routing on a call of the user based on an analysis result of the history behavior information.

An embodiment of the present invention provides an apparatus for queue routing, where the apparatus includes:

an information obtaining module, configured to obtain history behavior information of a user accessing a call center system; and a call processing module, configured to analyze the history behavior information, and perform queue routing on a call of the user based on an analysis result of the history behavior information.

It can be seen from the technical solutions provided in the embodiments of the present invention that the embodiments of the present invention have the following advantages.

(1) By analyzing history behavior information of a user, not only differentiated queue routing policies are provided for different types of users, but also differentiated services may be provided for the same user in different conditions.

(2) Means of serving a user in a call center is expanded, and according to an analysis result of the history behavior information of the user, more flexible service control policies for routing and queuing may be formulated.

BRIEF DESCRIPTION OF THE DRAWINGS

To illustrate the technical solutions according to the embodiments of the present invention more clearly, accompanying drawings needed for describing the embodiments are introduced briefly in the following. Apparently, the accompanying drawings in the following description are only some embodiments of the present invention, and persons of ordinary skill in the art may further derive other drawings from the accompanying drawings without creative efforts.

DETAILED DESCRIPTION OF THE EMBODIMENTS

The technical solutions according to the embodiments of the present invention are clearly and fully described below with reference to the accompanying drawings in the embodiments of the present invention. Obviously, the embodiments to be described are only part of rather than all of the embodiments of the present invention. All other embodiments obtained by persons of ordinary skill in the art based on the embodiments of the present invention without creative efforts should fall within the scope of the present invention.

The embodiments of the present invention are enhanced based on an existing call center system, and the involved technical solutions may be implemented on a CTI layer. The analysis of history behavior information of a user is added in an existing CTI routing and queuing mechanism, so as to solve the problem of limitations in the prior art, in which queue routing policies is formulated based on basic information of the user so that a more refined service manner cannot be provided for the user.

Through the technical solutions according to the embodiments of the present invention, not only different services may be provided for different users, but also different services may be provided for the same user in different conditions, so as to guarantee that a most satisfying service may be provided for the user in different preconditions.

The technical solutions of the present invention are described with specific embodiments in the following.

Figure 1:
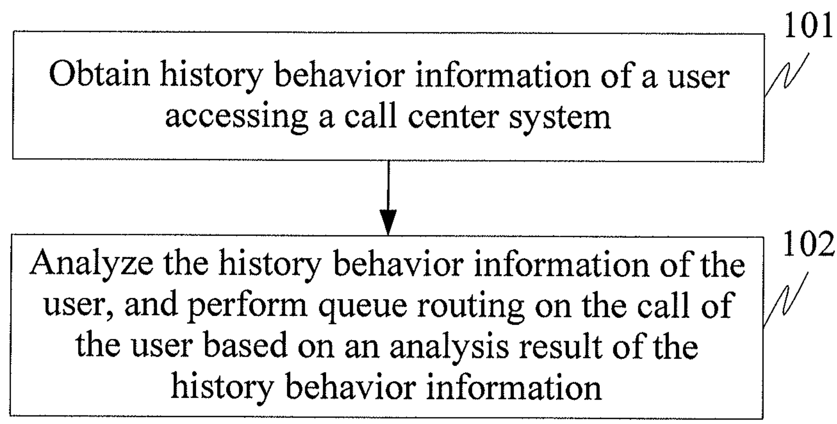
FIG. 1 is a flow chart of a method for queue routing according to an embodiment of the present invention.

As shown in FIG. 1, an embodiment of the present invention provides a method for queue routing. The method may includes:

Step 101: History behavior information of a user accessing a call center system is obtained.

In a specific embodiment, the history behavior information of the user may be collected and saved each time when the user accesses the call center system. The history behavior information may include bill information and service information each time when the user accesses the call center system.

When receiving a call, the call center system may obtain, according to user information of the call, the history behavior information corresponding to the user information from the pre-saved history behavior information.

Step 102: The history behavior information of the user is analyzed, and queue routing is performed on the call of the user based on an analysis result of the history behavior information. In the specific embodiment, the call center system may obtain and analyze the history behavior information of the user in real time, for example, obtains and analyzes the history behavior information of the user when receiving the call of the user; and the call center system may regularly obtain and analyze the history behavior information of the user, for example, obtains and analyzes the history behavior information of the user at a fixed time or periodically, stores the analysis result, and directly obtains the analysis result of the last time when receiving the call of the user.

In the embodiment of the present invention, by analyzing the history behavior information of the user, not only differentiated queue routing manners can be provided according to static information of different users, but also dynamic differentiated queue routing manners can be provided for the same user in different conditions, so means of serving the user in the call center is expanded, and more refined services are provided for customers.

In a specific embodiment, after performing the queue routing on the call, the call center system further updates the history behavior information of the user. Specifically, the call center system collects bill information and service information of the call of the user at this time, and updates the history behavior information of the user by using the collected bill information and service information. The bill information may include incoming call time, a calling object, a called object, and waiting time and service time of different devices in the system; and the service information may include main service contents in an IVR, for example, key information selected by the user and service contents corresponding to the keys; and service contents of a manual service, for example, an incoming call reason.

The history behavior information of the user accessing the call center system may be saved in a database. When being saved, the history behavior information may be stored according to certain rules in a manner of several association tables, for example, the history behavior information is stored according to the service content of the user, time of requesting the service, a level of the user, or another form, so when the history behavior information of the user is determined, searching or matching may be performed through a keyword, thus saving time and improving working efficiency.

Figure 2:
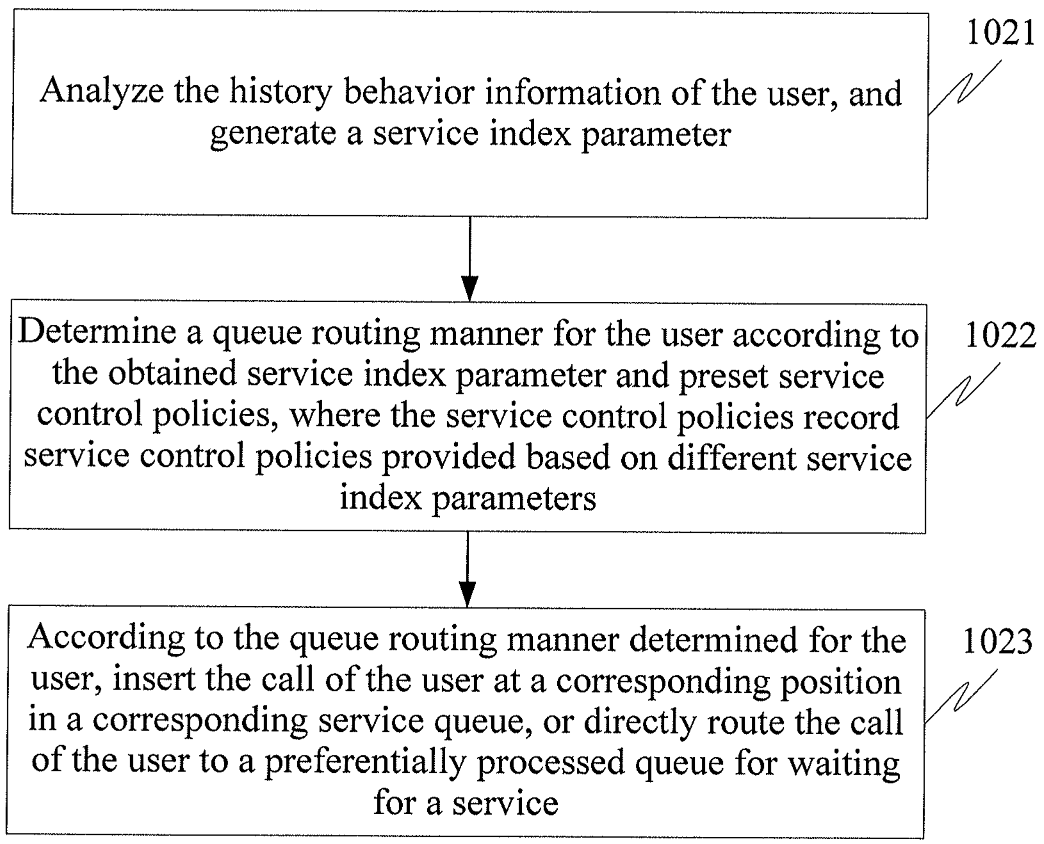
FIG. 2 is a flow chart about analyzing history behavior information according to an embodiment of the present invention.

In a specific embodiment, the procedure that the call center system analyzes the history behavior information of the user, and performs the queue routing on the call of the user based on the analysis result of the history behavior information may be implemented through the technical solution as shown in FIG. 2.

Step 1021: The history behavior information of the user is analyzed, and a service index parameter is generated. During specific implementation, the call center system may generate one or two service index parameters of a statistical index parameter and an analysis index parameter by analyzing the history behavior information of the user. The call center system may obtain the statistical index parameter by performing a statistical process on the history behavior information; and may further obtain an analysis index parameter through calculation and based on the obtained statistical index parameter in combination with at least one of the following: the history behavior information of the user, basic information of the user and current environment information, where the analysis index parameter includes any one of the following parameters: user weighted call-loss time, a user complaint index, and a user character-impatience index.

In the foregoing procedure, more specifically, the statistical index parameter is obtained after the statistical process is performed on the history behavior information, and is capable of describing features of a statistical result. The statistical index parameter may be divided into a determinant index parameter or a non-determinant index parameter.

The determinant index parameter may include: the total number of user access times (the total number of times that the call of the user accesses the call center system) and total call loss time (waiting time before the total call loss calls of the user are hung up).

The non-determinant index parameter refers to a parameter that may be adjusted according to demands, for example, the number of call access of the user in the recent n months or the number of call loss (the number of times that the user accesses the call center system but hangs up before obtaining the service) of the user in the recent n months, the number of access of the user in the recent n weeks, the number of call loss of the user in the recent n weeks, call loss time of the user in the recent n weeks, the number of continuous call loss of the user in the recent n weeks (the number of call loss times that the user does not obtain the service after accessing the system till now), and continuous call loss time (the sum of waiting time that the user does not obtain the service after accessing the system till now) of the user in the recent n weeks, the number of access of the user in the recent n days or the number of call loss of the user in the recent n days, the call loss time of the user in the recent n days, the number of continuous call loss of the user in the recent n days or the continuous call loss time of the user in the recent n days. A value of n may be dynamically specified according to actual demands.

The analysis index parameter is obtained by comprehensively processing the statistical index parameter, user basic information or basic history data. The analysis index parameter may include any one of the following parameters: the user weighted call-loss time, the user complaint index, and the user character-impatience index. The analysis index parameter is usually formulated based on a certain guiding idea and a service form, and an algorithm of the analysis index parameter is subjective to a certain extent.

In the following, algorithms of the foregoing analysis index parameters are given, but are not limited to the algorithms given in the embodiment of the present invention.

The recent user weighted call-loss time is obtained through the following formula: continuous call loss time in the recent 1 month in the statistical index parameter×A1+call loss time in the recent 1 week in the statistical index parameter×A2+ continuous call loss time today in the statistical index parameter×A3.

The foregoing A1, A2, and A3 are all weighting coefficients and may be adjusted according to demands, for example, weighting parameter values are set according to calling time. The nearer to the current calling time, the higher the weighting coefficient is, and the farther to the current calling time, the lower the weighting coefficient is, for example, A1=0.1, A2=0.3, and A3=0.6.

The user complaint index may be obtained through comprehensive calculation according to information such as service contents of the complaint, duration and the number of times of the complaint, duration of a processing procedure, processing result, whether the user feeds back, and a feedback result, for example, user complaint index=continuous call loss time×problem severity coefficient×access frequency (the number of dialing times on the current day), where the problem severity coefficient is 1, 1.5, 2 or 2.5, and may be set according to the frequency of the number of dialing times on the current day, and the more the number of dialing times is, the higher the problem severity coefficient is; or user complaint index=continuous call loss time×emotion index, where the higher the calling frequency is, the higher the emotion index is.

The user character-impatience index may be analyzed and calculated according to the number of access times of the user, the access frequency of the user, the number of call loss times of the user and call loss time of the user recently, for example, user character-impatience index=highest access frequency (the number of maximal dialing times each day)/ average waiting time (the unit is second) in the queue before hanging up.

The statistical index parameter and the analysis index parameter that are obtained after the foregoing statistical analysis is performed on the history behavior information may be used as judgment conditions for selecting the routing and queuing manners for the user in the preset service control policies.

Particularly, the procedure for analyzing and processing the history behavior information may be implemented through a database storage procedure, a programming language and database storage procedure, a script and database storage procedure. In the prior art, the history behavior information of the user call service is not recorded and processed, so the information cannot be used for serving the call processing service. By analyzing and processing the history behavior information, the processing capability and the means in the prior art are greatly improved, so as to provide flexible interfaces and implementation means for data analysis, and provide convenience for the parameter modification and the service expansion in future applications.

Particularly, the foregoing process of generating the service index parameter may include a real-time analysis and a periodic analysis.

The real-time analysis is to analyze and process the history behavior information corresponding to the service, obtain a current real-time analysis result, and generate a real-time service index parameter after the call of the user accesses the call center system.

The periodic analysis aims at reducing the load of the system, where relatively idle time is automatically used as the time of analyzing and processing the data, and when it is necessary to select and provide the queue routing manner for the user, the periodic analysis result is taken to generate the service index parameter as the judgment condition for selection in the preset service control policies. For example, it is set to perform data analysis at a certain time at night. However, the periodic analysis result is not the real-time data of the current system, so a certain deviation exists.

Step 1022: The queue routing manner provided for the user is determined according to the obtained service index parameter and the preset service control policies, where the service control policies record the service control policies provided based on the different service index parameters.

Through the service index parameter generated in step 1021, the generated service index parameter may be used as a selection condition, the optimal service control policy is selected for the call of the user in the preset service control policies, and the queue routing manner for the call of the user is determined. The determining of the queue routing manner includes determining a queuing queue and/or the position of the call in the queue for the call of the user according to the selected service control policy. The preset service control policies are preset according to the service index parameter, and different service index parameters correspond to service control policies provided for the user, where the service control policies and the service index parameters may have the relation of one to one, one to multiple or multiple to one.

As described above, when the service control policies are preset, the range of the service index parameter is limited, so based on the different service index parameters, the history behavior information obtained after the user enters the call center system is relevant to the required service index parameter, or the history behavior information after the statistical analysis may be used to directly or indirectly obtain the service index parameter, and the queue and routing manner is provided for the user according to the generated service index parameter.

Specifically, the preset service control policies may be formulated and operated in the script manner, and when the script or the file of the service control policy is executed, the service is practically controlled and processed by the ACD. The tool for formulating the queue routing policy may be implemented based on a current IVR process custom tool, for example, a Service Creation Environment (SCE) patterned process design and development tool, or is implemented by using a Voice eXtensible Markup Language (VXML) parser, a text manner script development tool.

In the following, the procedure for formulating the preset service control policies is illustrated with examples.

First, the service control policies may be formulated according to the following contents: user basic information (for example, the user basic information and the bill information); current environment information (for example, time, date, and busy or idle condition of the system); the statistical index parameter in the service index parameter (for example, the total number of times that the user calls, the number of times that the user calls in the recent 6 months, the number of call loss times that the user calls in the recent 3 months, the number of continuous call loss times that the user calls in the recent 1 month, the continuous call loss time that the user calls in the recent 1 week, the number of times of call access on the current day, the number of continuous call loss times, and the continuous call loss time); and the analysis index parameter (for example, the weighted call loss time of the user, the user complaint index, and the user character-impatience index).

For example, taking the statistical index parameter as an example, the preset service control policies are set as: in a complaint service, the call of the user is directly inserted to the position before the call whose the waiting time is smaller than the continuous call loss time of the user; it is assumed that the continuous call loss time of the user in the complaint service is 1 minute, so according to the foregoing service control policy, the queue routing manner of the user is that the call of the user is directly inserted before the call whose waiting time is smaller than 1 minute. After a certain user accesses the call center, the statistical index parameter (continuous call loss time) obtained after the statistical analysis is performed on the history behavior information of the user is used as the judgment condition, and is compared with the preset service policy; when the statistical index parameter satisfies the condition of the policy, the policy is executed, and when the statistical index parameter does not satisfy the condition of the policy, the user is processed as a common user; through the setting method, the continuous call loss time of the user is used as the queuing time this time for calculation, and thus the waiting time of the user is shortened.

Taking the analysis index parameter as an example, the preset service control policy is set as: the call loss time and frequency of the user in the statistical index parameter are taken into consideration comprehensively, and the user whose user complaint index greater than or equal to 5 is directly routed to a preferentially processed queue for queuing. After the history behavior information of the certain user is analyzed, it is known that the user frequently accesses the system in a certain period of time and does not obtain the service, the emotion index is set according to the call loss time and the frequency, where the higher the index is, the more impatient the user is, and the more preferentially the service should be processed, for example, the call loss time of the user is 5 minutes, the emotion index is set as I=1.2, and the user complaint index obtained through calculation is 6, so the queue routing manner determined for the user is that the call of the user is routed to the preferentially processed queue for waiting, and thus the probability that the user receives the service this time is increased.

Step 1023: According to the queue routing manner determined for the user, the call of the user is inserted at a corresponding position in a corresponding service queue, or the call of the user is directly routed to the preferentially processed queue for waiting for the service. In the method for queue routing according to the embodiment of the present invention, the history behavior information of the user accessing the call center system is statistically analyzed, so the user may obtain a differentiated refined service, for example, the time that the user waits for the service is shortened, or the probability that the user receives the service is increased.

Based on the foregoing embodiment, the situation in which the user accesses the call center system for many times to wait for the service when the system is relatively busy may be easily solved.

After the user accesses the call center system, the history behavior information of the user is analyzed. When it is found that the user is impatient to wait and usually hangs up before being connected through to the operator, the user has the history record of the call loss time. In this case, the call loss time of the user may be weighted to obtain the weighted call loss time T in the service index parameter.

The corresponding queue routing manner is determined in the preset service control policies according to the weighted call loss time T, the user is directly inserted at the position where the current queuing waiting time is larger than T, or is directly routed to the preferentially processed queue for waiting, so the queuing time of the user is greatly shortened through this manner, and even if the user still waits for the service and does not obtain the service this time, the probability that the user receives the service is increased next time.

Figure 3:
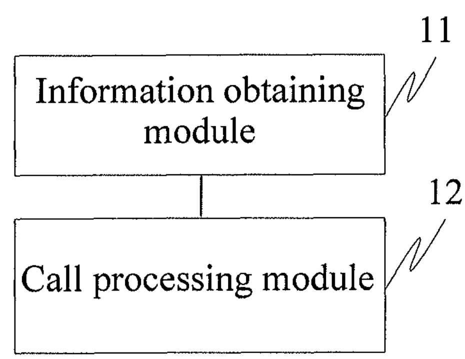
FIG. 3 is a schematic structural diagram of an apparatus for queue routing according to an embodiment of the present invention.

As shown in FIG. 3, based on the embodiment of the method for queue routing in FIG. 2, an apparatus for queue routing according to an embodiment of the present invention is obtained, where the apparatus may include an information obtaining module 11 and a call processing module 12.

The information obtaining module 11 is configured to obtain history behavior information of a user accessing a call center system.

The history behavior information may include bill information and service information each time when the user accesses the call center system. The history behavior information of the user may be collected and saved in advance. If a real-time analysis manner is adopted, when receiving a call of the user, the information obtaining module 11 may obtain, according to user information of the call, the history behavior information corresponding to the user information from the pre-saved history behavior information, and provides the history behavior information for the call processing module 12 for analysis. Certainly, the information obtaining module 11 may directly provide the history behavior information for the call processing module 12 for analysis when the collection is completed each time. If a periodic analysis manner is adopted, the information obtaining module 11 may obtain the history behavior information of the user from the pre-saved history behavior information when the system is idle or according to a fixed period, and provides the history behavior information for the call processing module 12 for analysis.

The call processing module 12 is configured to analyze the history behavior information of the user, and perform queue routing on the call of the user based on an analysis result of the history behavior information.

Specifically, the call processing module 12 may generate a service index parameter according to the analysis of the history behavior information, where the service index parameter may include a statistical index parameter and/or an analysis index parameter, and the process of generating the service index parameter may be implemented with reference to the technical solution of step 1021 in FIG. 2.

The call processing module 12 determines, according to the obtained service index parameter and preset service control policies, a queue routing manner for the user, where the service control policies record service control policies provided based on different service index parameters, and the procedure may be specifically implemented with reference to the technical solution of step 1022 in FIG. 2.

The call processing module 12 inserts the call of the user at a corresponding position in a corresponding service queue according to the queue routing manner determined for the user; or directly routes the call of the user to a preferentially processed queue for waiting for the service.

Figure 4:
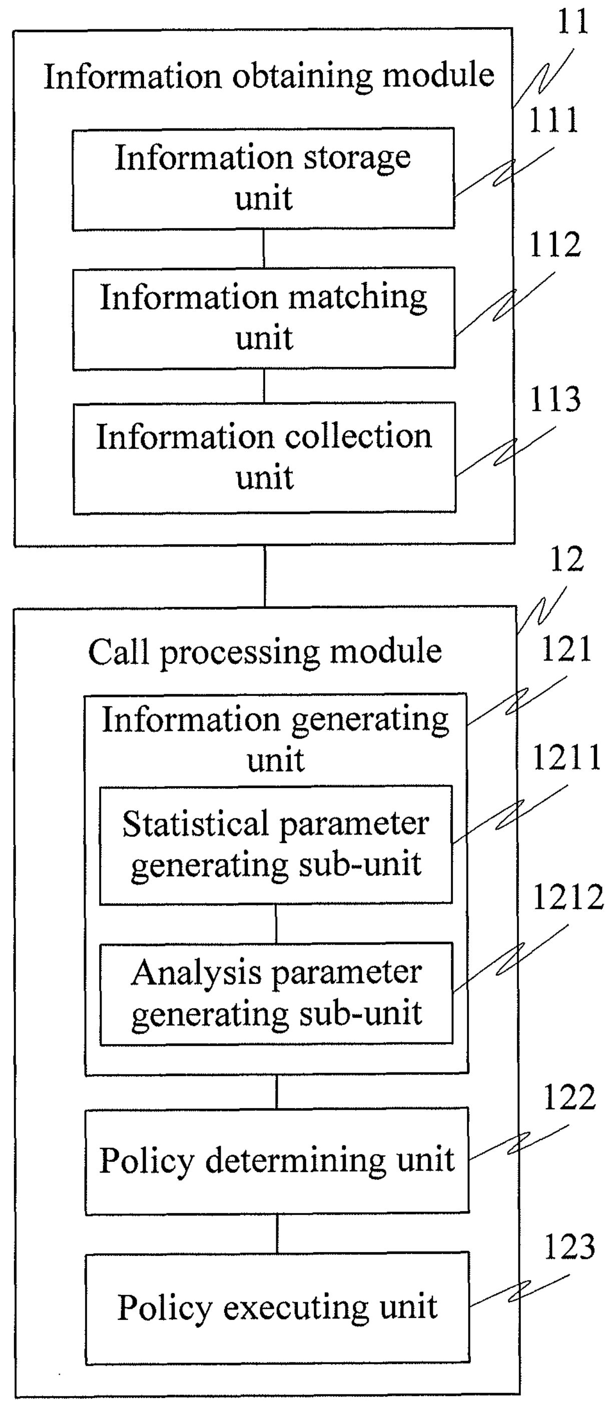
FIG. 4 is a schematic structural diagram of an apparatus for queue routing in specific application according to an embodiment of the present invention.

Based on the foregoing functions, functional structures of the information obtaining module 11 and the call processing module 12 in a specific embodiment may be as shown in FIG. 4, where the information obtaining module 11 may specifically include:

an information storage unit 111, configured to store the history behavior information of the user accessing the call center system, where the history behavior information includes bill information and service information each time when the user enters the call center system; and an information matching unit 112, configured to obtain, according to the user information of the call accessing the call center system, the history behavior information corresponding to the user information from the history behavior information pre-saved in the information storage unit 111.

Optionally, the information obtaining module 11 may specifically further include:

an information collection unit 113, configured to collect the bill information and the service information of the call of the user each time, and update the history behavior information of the user pre-saved in the information storage unit 111 by using the collected bill information and service information.

The call processing module 12 may specifically include:

an information generating unit 121, configured to analyze the history behavior information of the user, and generate a service index parameter;

a policy determining unit 122, configured to determine, according to the service index parameter generated by the information generating unit 121 and preset service control policies, a queue routing manner for the user, where the service control policies record the service control policies provided based on the different service index parameters; and a policy executing unit 123, configured to insert the call of the user at a corresponding position in a corresponding service queue according to the queue routing manner determined for the user by the policy determining unit; or directly route the call of the user to a preferentially processed queue for waiting for a service.

Further, the information generating unit 121 may specifically include:

a statistical parameter generating sub-unit 1211, configured to obtain a statistical index parameter after a statistical process is performed on the history behavior information; and an analysis parameter generating sub-unit 1212, configured to obtain an analysis index parameter through calculation by combining the statistical index parameter obtained by the statistical parameter generating sub-unit 1211 with at least one of the following: the history behavior information of the user, the user basic information, and the current environment information, where the analysis index parameter includes any one of the following parameters: user weighted call-loss time, a user complaint index, and a user character-impatience index.

Reference may be made to the technical solutions in the method embodiment as shown in FIGS. 1 and 2 for the specific technical solution for implementing the apparatus for queue routing according to the embodiment of the present invention, which is not repeatedly described here.

The apparatus for queue routing in the foregoing embodiment may be partially or entirely disposed in devices such as the CTI/IVR or the ACD in the call center system.

Figure 5:
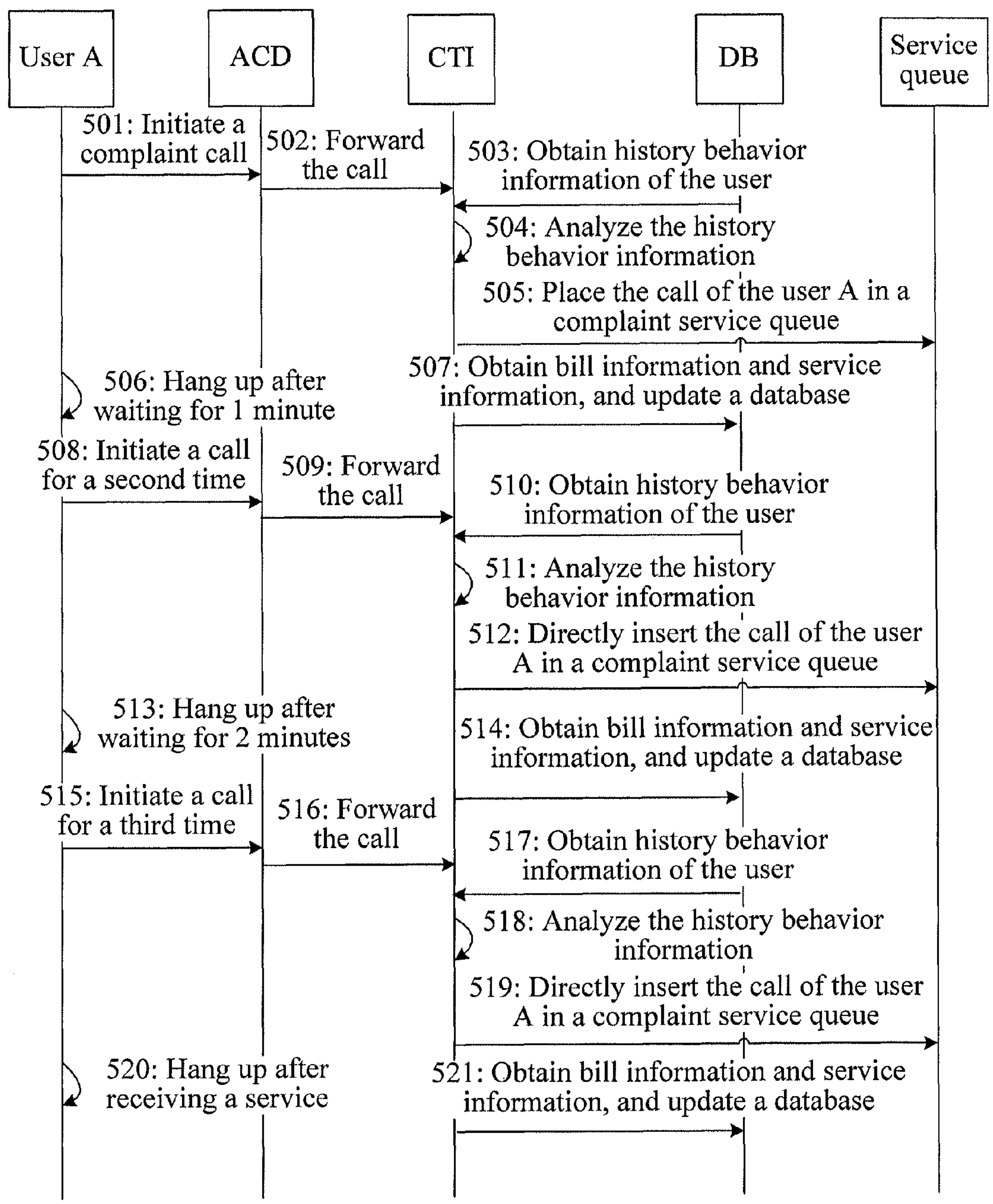
FIG. 5 is a schematic structural diagram of a method for queue routing in specific application according to an embodiment of the present invention.

Referring to FIG. 5, taking an example that the routing queue policy based on the user history waiting time is implemented in the CTI/IVR, the user call queue routing procedure is illustrated in the specific application, where the history behavior information in this embodiment is stored in a database DB.

501: A user A dials a call center number 10086 to initiate a call for complaining a certain service, where the call accesses a call center system through routing of a communication network.

502: After the service complaint call of the user A enters the call center system, an ACD forwards the call to CTI/IVR for queue routing processing.

503: The CTI/IVR obtains, according to basic information of the user A, history behavior information of the user A from a database that stores the history behavior information, where the information of the user A is carried in the call.

Specifically, the basic information of the user A may include a telephone number of the user and a name of the user. In the embodiment of the present invention, the history behavior information of the user A is obtained by using the telephone number of the user A. First, it may be identified that the user A is an Easyown common user according to the telephone number, and the history behavior information corresponding to the telephone number is searched according to the telephone number in the database where the history behavior information is recorded in advance. The history behavior information includes bill information and service information of the user A each time when the user A enters the call center system.

504: The history behavior information of the user A is analyzed, and a queue routing manner for the call of the user A is determined.

Specifically, in this embodiment, it is assumed that before the user A accesses the call center system this time, the accumulated call loss times and waiting time are both 0. Therefore, through the analysis of the history behavior information of the user A and according to the preset service control policies, it is determined that the conditions of executing the preset service control policies are not satisfied, so the user is processed according to an access process for a common user that accesses the call center system for the first time, and no refined service control policy is provided.

505: The call of the user A is processed according to the access process for the common user that accesses the call center system for the first time, and the call is placed in a complaint service queue for queuing according to the access time.

506: After accessing the call center system this time, the user A hangs up after waiting for 1 minute.

507: The bill information and service information when the user A accesses the call center system this time are collected, and the history behavior information in the database is updated.

508: The user A dials the call center number 10086 for a second time for initiating a call for complaining a certain service, where the call accesses the call center system through routing of the communication network.

509: After the service complaint call of the user A enters the call center system, the ACD forwards the call to the CTI/IVR for queue routing processing.

510: The CTI/IVR obtains history behavior information of the user A according to the telephone number of the user A.

511: The history behavior information is analyzed, and a queue routing manner for the call of the user A is determined.

Specifically, when the user A accesses the call center system for the second time, because the user A hangs up without receiving the service in the previous time, the history behavior information of the user A is statistically analyzed, and the obtained statistical index parameter is that the number of call loss times of the user A is 1 and call loss time of the user A is 1 minute. It is assumed that the preset service control policy is that the call is inserted to a position before the user whose queuing time is smaller than the call loss time for waiting for the service.

In this case, according to the obtained statistical index parameter and the preset service control policies, the queue routing manner of the user A is determined as: the call is directly inserted to a position before the user whose queuing time is smaller than 1 minute for waiting for the service.

512: The call of the user A is directly inserted to a position before the user whose queuing time is smaller than 1 minute for waiting for the service.

513: Because too many persons are queuing at present, the user A hangs up again after waiting for 2 minutes.

514: The bill information and service information of the user A accessing the call center system for the second time are collected, and the history behavior information in the database is updated.

515: The user dials the call center number 10086 for a third time for initiating a call for complaining a certain service, where the call accesses the call center system through routing of the communication network.

516: After the service complaint call of the user A enters the call center system, the ACD forwards the call to the CTI/IVR for queue routing processing.

517: History behavior information of the user A is obtained according to the telephone number of the user A.

518: The history behavior information is analyzed, and a queue routing manner for the call of the user A is determined.

Specifically, it is known after analyzing the history behavior information of the user A that a calling frequency in the current statistical index parameter of the user A is quite high, the call loss time is 1+2=3 minutes, the number of call loss times is 2, and the frequency is 2 times per hour. In order to increase the service probability of the user and comfort the user with dissatisfaction, further analysis may be performed based on the obtained statistical index parameter, so as to obtain the analysis index parameter, for example, the weighted call loss time. Specifically, the call loss emotion index coefficient of the user A is set to 1.2, so the weighted call loss time is equal to $3\times1.2=3.6$. According to the preset service policy, the weighted call loss time of the user A is used as the waiting time for determining the position of the call of the user A in the queue, that is, the queue routing policy for the call of the user A is that the call is directly inserted before the user whose queuing time is smaller than 3.6 minutes.

519: The call of the user A is directly inserted at a position before the user whose waiting time is smaller than 3.6 minutes for waiting for the service.

520: When the longest accumulated waiting time in the current queue is 3.5 minutes, and the waiting time of the user A is 3.6 minutes, the call of the user A is inserted to the first position of the queue for receiving the service.

521: The bill information and service information of the user A accessing the call center system for the third time are collected, and the history behavior information in the database is updated.

In conclusion, the complaint service of the user A is processed in time, so that the dissatisfaction of the user A does not further rise, and thus, the dissatisfaction of the user or complaint of the user is reduced, and the user service quality of the call center system is greatly improved.

By adopting the technical solutions of the embodiments of the present invention, in the case that the user is impatient and hangs up without waiting for the connection of the service for many times, the call loss time of the user is weighted and accumulated and is used as the waiting time in the system at this time for queuing, that is, the user is inserted to a front position in the corresponding service queue, and thus the probability that the user of this type receives the service is increased.

Through the statistical analysis of the history behavior information, when it is found that recently certain users frequently enter the call center for processing problems, but the problems are not solved for a long time, the dissatisfaction of the user continuously rises and the call of the user is preferentially processed or directly routed to a high-level operator, and the operator is reminded of doing a good comfort work, and thus, the dissatisfaction of the user for the system is reduced, and a better service is provided for the user.

Persons of ordinary skill in the art should understand that all or part of the steps in the method according to the foregoing embodiments may be implemented by a program instructing relevant hardware, and the program may be stored in a computer readable storage medium. When the program is executed, the processes in each method of the foregoing embodiments are performed. The storage medium may be a magnetic disk, an optical disk, a Read-Only Memory (ROM) or a Random Access Memory (RAM).

The preceding descriptions are merely some exemplary embodiments of the present invention, but not intended to limit the present invention. Modifications and equivalent replacements made by those skilled in the art without departing from the scope of the technical solutions of present invention fall within the scope of the present invention. Therefore, the scope of the present invention is subject to the scope of the claims.

What is claimed is:

1. A method for queue routing, comprising analyzing user's past behavioral interaction experience information by performing:

obtaining a user's past behavioral interaction experience history information when the user accessing a call center system;

analyzing the user's past behavioral interaction experience history information when accessing the call center system;

performing a statistical process on the user's past behavioral interaction experience history information to obtain a statistical index parameter;

calculating an analysis index parameter of the user by combining the statistical index parameter with the past behavioral interaction experience history information of the user when accessing the call center system, and at least one of the following pertaining to the user: user basic information, and current environment information;

wherein the analysis index parameter of the user comprises all of the following parameters: user weighted call-loss time, a user complaint index, and a user character-impatience index;

generating a service index parameter for the user, wherein the service index parameter comprises at least one of: the statistical index parameter of the user and the analysis index parameter of the user;

providing preset service control policies for the user that are preset based on different service index parameters for the user;

determining a queue routing manner for the user according to the service index parameter for the user and the preset service control policies for the user; and inserting a call of the user at a corresponding position in a corresponding service queue according to the queue routing manner determined for the user; or directly routing the call of the user to a preferentially processed queue for waiting for a service.

2. The method according to claim 1, wherein the obtaining of the user's past behavioral interaction history information when the user accessing the call center system comprises:

obtaining, according to the user's past behavioral interaction experience history information when the user accessing the call center system, pre-saved past behavioral interaction history information corresponding to the user, wherein the user's past behavioral interaction experience history information further comprises bill information and service information each time when the user enters the call center system.

3. The method according to claim 2, further comprising: collecting the bill information and service information of the call of the user this time, and updating the past behavioral interaction history information of the user by using the collected bill information and service information.

4. An apparatus for queue routing based on analyzing user's past behavioral interaction information, comprising:

an information obtaining module, configured to obtain a user's past behavioral interaction experience history information when the user accessing a call center system; and a call processing module, configured to analyze the user's past behavioral interaction experience history information, and perform queue routing on a call of the user based on an analysis result of the user's past behavioral interaction experience history information when accessing the call center system;

wherein the call processing module comprises:

an information generating unit, configured to analyze the user's past behavioral interaction history information, and generate a service index parameter for the user;

a policy determining unit, configured to determine a queue routing manner for the user according to the service index parameter for the user generated by the information generating unit and preset service control policies for the user, wherein the preset service control policies for the user record service control policies for the user provided based on different service index parameters for the user; and a policy executing unit, configured to insert the call of the user at a corresponding position in a corresponding service queue according to the queue routing manner determined for the user by the policy determining unit; or directly route the call of the user to a preferentially processed queue for waiting for a service; and wherein the information generating unit comprises:

a statistical parameter generating sub-unit, configured to obtain a statistical index parameter after performing a statistical process on the user's past behavioral interaction experience history information; and an analysis parameter generating sub-unit, configured to obtain an analysis index parameter of the user by combining the statistical index parameter obtained by the statistical parameter generating sub-unit with the past behavioral interaction experience history information of the user, and at least one of the following: user basic information, or current environment information; wherein the analysis index parameter of the user comprises all of the following parameters: user weighted call-loss time, a user complaint index, and a user character-impatience index.

5. The apparatus according to claim 4, wherein the information obtaining module specifically comprises:

an information storage unit, configured to store the user's past behavioral interaction experience information when the user accessing the call center system, wherein the user's past behavioral interaction experience information further comprises bill information and service information each time when the user enters the call center system; and an information matching unit, configured to obtain, according to user's information of the call when accessing the call center system, pre-saved past behavioral interaction experience history information corresponding to the user.

6. The apparatus according to claim 5, wherein the information obtaining module further specifically comprises:

an information collection unit, configured to collect the bill information and service information of the call of the user each time, and update the user's past behavioral interaction experience history information of the user pre-saved in the information storage unit by using the collected bill information and service information.

* * * * *